Patented June 6, 1933

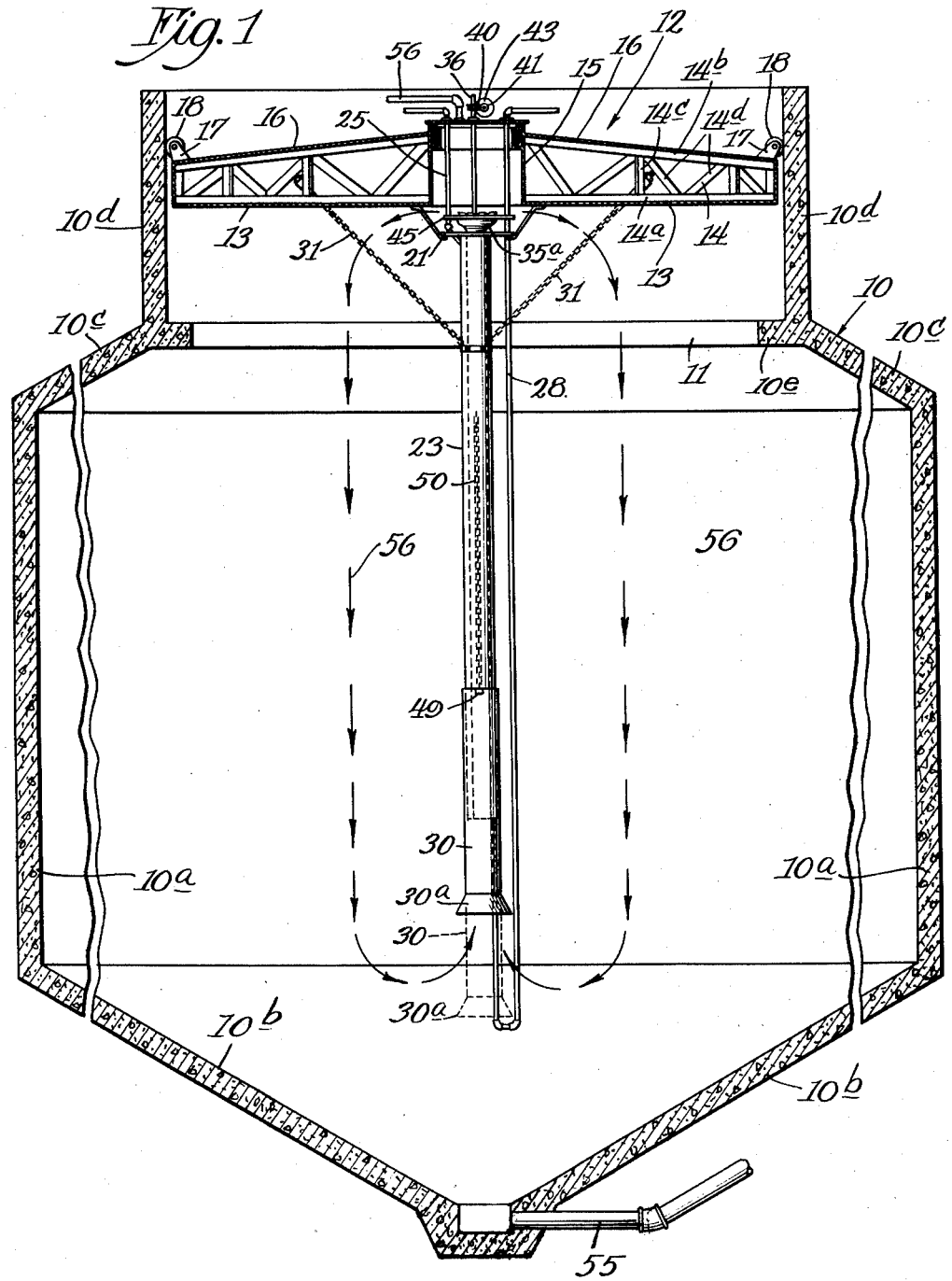

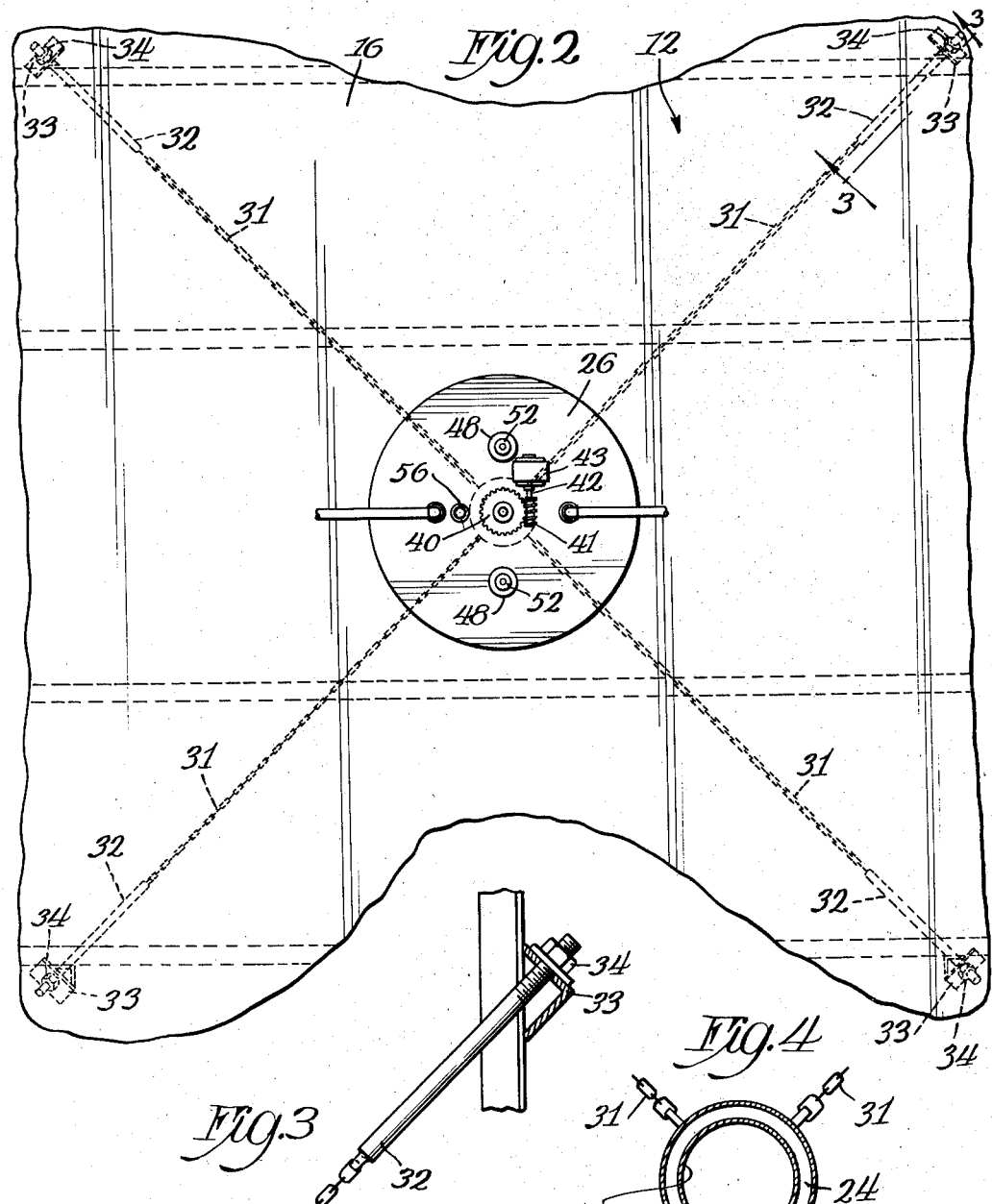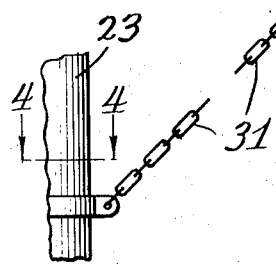

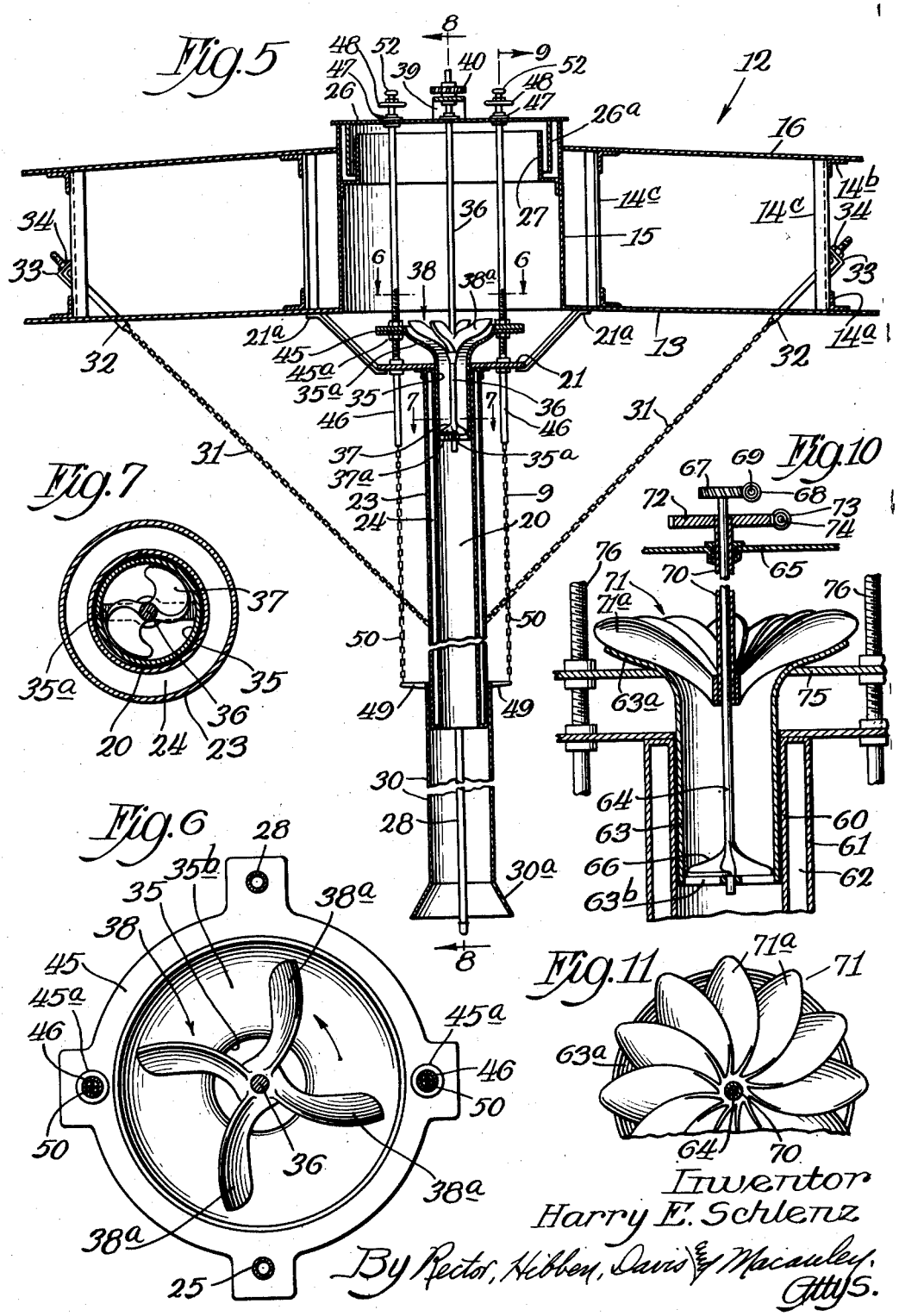

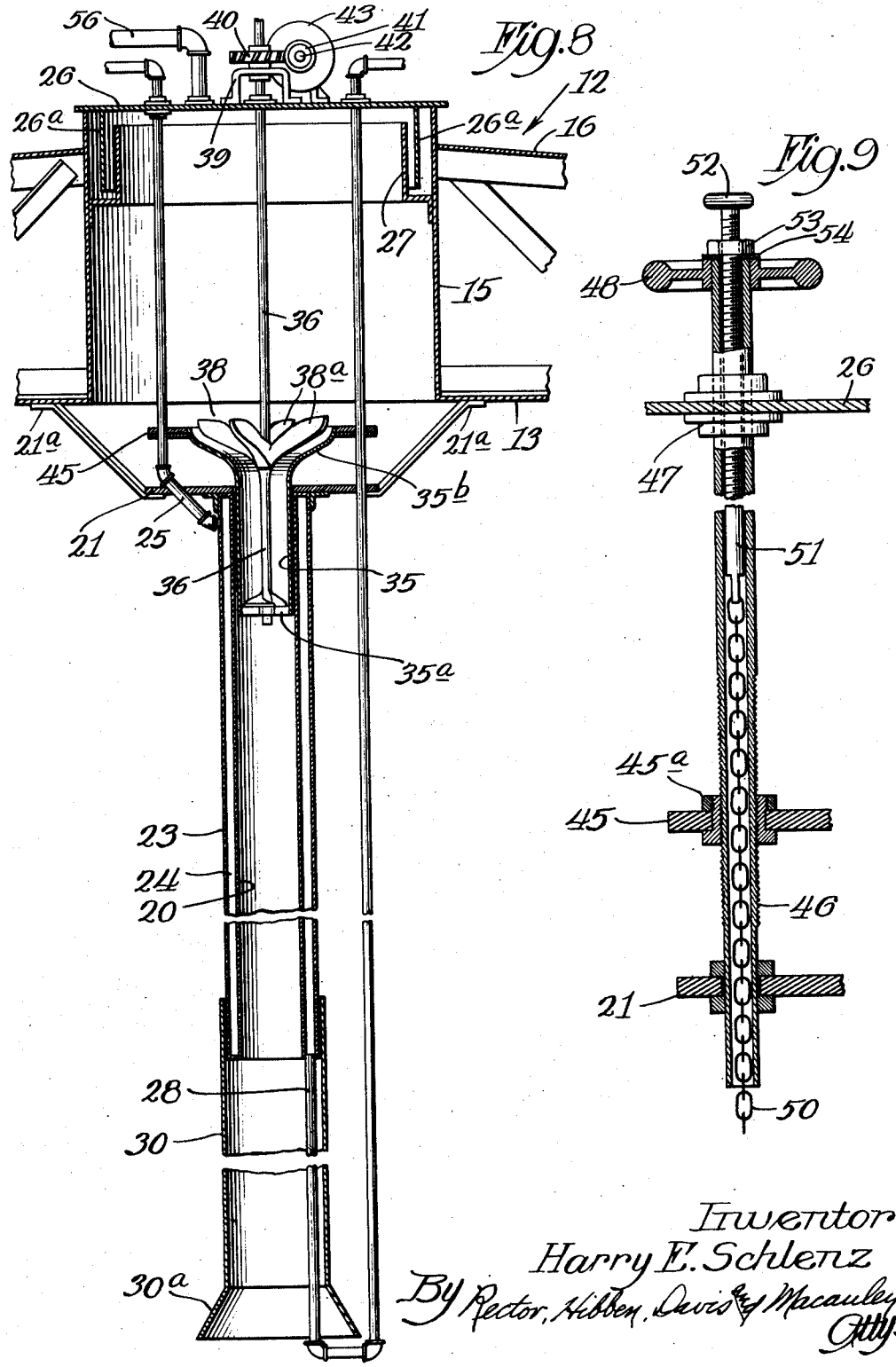

1,912,595

UNITED STATES PATENT OFFICE

HARRY E. SCHLENZ, OF CHICAGO, ILLINOIS, ASSIGNOR TO PACIFIC FLUSH TANK COMPANY, OF CHICAGO, ILLINOIS, A CORPORATION OF ILLINOIS

SLUDGE DIGESTION TANK

Application filed August 29, 1930. Serial No. 478,670.

This invention relates to improvements in sludge digestion tanks adapted for use in sewage disposal systems and the principal object of the invention is to provide a sludge digestion tank comprising a circulating device whereby a circulation is set up in the tank and the digestion of its contents hastened. A further object of the invention is to provide a sludge digestion tank of the cover type comprising means for circulating a portion of the sludge from the lower portion of the tank to the top of the tank where it is distributed over the scum layer, thereby causing the scum layer to be broken down and mixed with a slightly heavier material so that the mass is caused to settle to the bottom of the tank while at the same time mixing with the slowly digesting scum an active digesting material. A further object of the invention is to provide a sludge digestion tank comprising means for circulating a portion of its contents and heating the material during its circulation. Still another object of the invention is to provide a sludge digestion tank with circulating apparatus which is mounted in the tank as a unit so that it may be readily removed for the purpose of cleaning or the like. A further object of the invention is to provide a circulating system for a sludge digestion tank comprising adjustable parts whereby the speed of circulation may be regulated as desired. Other objects of the invention relate to various features of construction and arrangement which will appear more fully hereinafter.

The nature of the invention will be understood from the following specification taken with the accompanying drawings, in which two embodiments are illustrated. In the drawings, Fig. 1 shows a vertical central section through a sludge digestion tank embodying the features of the present invention;

Fig. 2 shows a partial top plan view of the central portion of the cover and associated parts of the circulating apparatus;

Fig. 3 is a detail section on the line 3—3 of Fig. 2;

Fig. 4 is a detail section on the line 4—4 of Fig. 3;

Fig. 5 is an enlarged central vertical section through the central part of the cover and the circulating apparatus;

Fig. 6 is a horizontal detail section taken on the line 6—6 of Fig. 5;

Fig. 7 is a horizontal detail section taken on the line 7—7 of Fig. 5;

Fig. 8 is an enlarged vertical detail section taken on the line 8—8 of Fig. 5;

Fig. 9 is an enlarged vertical detail section taken on the line 9—9 of Fig. 5;

Fig. 10 is a vertical section similar to that of Fig. 5 showing a modified form of construction in which the sludge is circulated downwardly instead of upwardly, and Fig. 11 shows a top plan view of the rotary intake accelerator shown in Fig. 10.

As illustrated in the drawings, the invention comprises a tank 10, formed of concrete or other suitable material, which has an outer cylindrical wall $10^a$ connected at its bottom with the downwardly converging bottom wall $10^b$. At its upper end, the cylindrical outer wall $10^a$ is connected with an inclined top wall $10^c$ which carries the upwardly extending cylindrical cover containing wall $10^d$. An annular flange or shoulder $10^e$ extends inwardly from the inclined top wall $10^c$ and forms the boundary of an opening 11 in addition to providing a support for the cover 12 when the cover is in its lowermost position. Although the invention may be applied to a tank having a fixed cover, it is illustrated in connection with a cover which is arranged to float on the contents of the tank and this cover comprises a lower circular sheet metal plate 13 secured to the lower edges of a number of truss-like frames 14 made up of lower frame members $14^a$, upper frame members $14^b$, vertical frame members $14^c$ and diagonal brace members $14^d$. At its center, the lower plate 13 is provided with an opening and around this opening it is connected with an upwardly extending sleeve 15 which projects slightly above the top cover plate 16 which is mounted upon the frame members 14. Around its outer edge, the cover 12 is provided with a number of brackets 17 carrying rollers 18 which are adapted to travel upon the inner surface of the wall section $10^d$ as the cover floats up and down to adjust itself to the level of the contents of the tank.

The apparatus for effecting the circulation of the sludge within the tank is carried by the cover 12 and it comprises a vertical draft tube 20 which has its upper end secured to a bracket 21 having flanges 21ª which are secured to the cover plate 13 beyond the lower extremity of the sleeve 15. The draft tube 20 is surrounded by a water jacket 23, leaving an intervening water chamber 24 through which warm water my be circulated for the purpose of heating the sludge as it passes upwardly through the draft tube. The hot water is introduced into the chamber 24 through an inlet pipe 25 extending downwardly through the sleeve 15 and through the cover 26 which is mounted over the upper end of this sleeve. The cover 26 has a downwardly extending annular flange 26ª which is located between the sleeve 15 and an upwardly extending flange 27 which is secured to and offset inwardly from the sleeve so that by placing water within the chamber formed by the flange 27 and the surrounding portion of the sleeve 15, a gas-tight closure for the cover 26 may be formed. The water which circulates downwardly through the chamber 24 passes outwardly through a discharge pipe 28 which extends upwardly at the side of the draft tube and thence outwardly through the sleeve 15 and cover 26, as shown particularly in Fig. 8. An adjustable draft tube 30 is mounted on the lower end of the water jacket 23 to form a continuation of the main draft tube 20 and this adjustable draft tube is provided with a flared mouth 30ª through which the sludge is drawn upwardly. For the purpose of giving stability to the draft tube and preventing lateral swaying thereof, a number of supporting chains 31 are connected to the water jacket 24 some distance below the cover 12 and these chains are attached to bolts 32 which extend through brackets 33 secured to the upright members 14ᶜ of the cover and engaged on their threaded ends by nuts 34 so that the tension in the chains may be adjusted to regulate the pull exerted upon the lower portion of the draft tube.

Within the upper end of the draft tube 20 there is mounted a pump casing 35 which has an aperture in the lower wall 35ª within the tube and a flared outlet 35ᵇ at its upper end located within the bracket 21. A pump shaft 36 is journaled in the lower wall 35ª of the pump casing and has its upper end journaled within the cover 26 of the sleeve 15. An impeller 37, of the screw type, is secured on the pump shaft 36 immediately above the lower wall 35ª and a distributor 38 having a plurality of radiating inclined vanes 38ª is secured on the shaft 36 within the flared portion 35ª of the pump casing so that when the shaft is rotated, the sludge is drawn upwardly through the draft tube by the rotating vanes 37ª of the impeller and is then discharged upwardly through the mouth of the pump casing, being thrown upwardly to some extent by the vanes 38ª of the distributor, so that it becomes mingled with the floating scum in the top of the tank. As shown particularly in Figs. 2 and 8, the shaft 36 of the pump is journaled in a bracket 39 secured to the cover 26 and a worm wheel 40 is secured on the shaft above this bracket to mesh with a worm 41 secured on the shaft 42 of an electric motor 43. This motor is mounted on the cover 26 and its speed may be varied for the purpose of varying the speed of rotation of the pump impeller 37.

The pump casing 35 has a slidable engagement with the draft tube 20 and its position within the upper end of the draft tube may be varied for the purpose of regulating its effect in moving the sludge upwardly and for varying the elevation at which the sludge is discharged from the flared mouth 35ª of the casing. For this purpose, the upper end of the mouth 35ᵇ is secured to a horizontal plate 45 located within the bracket 21 and provided with bosses 45ª which have internally threaded apertures engaged by the threaded portions of the adjusting sleeves 46. These sleeves extend downwardly through and are rotatably mounted in the bracket 21 and have their upper ends rotatably mounted in bearings 47 carried by the cover 26. Hand wheels 48 are carried by the upper ends of these sleeves and may be manually rotated for the purpose of turning the sleeves and thereby varying the elevation of the plate 45 and the pump casing 35. The worm wheel 40 is splined upon the upper end of the pump shaft 36 so that the pump shaft may move upwardly with the pump casing without destroying the driving connection of the shaft with the motor.

For the purpose of adjusting the elevation of the lower draft tube 30, this tube is provided at its upper end with outwardly extending arms 49 which are connected to supporting chains 50. These chains extend upwardly through the tubes 46, as shown particularly in Fig. 9, and have their upper ends connected to adjusting members 51 which are mounted within the upper ends of the tubes 46 and which are provided with handles 52 adapted to be engaged by the hands of the operator. These adjusting members 51 are externally threaded and are engaged by nuts 53 which in turn engage the washers 54 seated upon the upper ends of the tubes 46 so that by adjusting the positions of the members 51 within the nuts 53, the chains 50 may be raised or lowered to vary the position of the adjustable draft tube 30 and thus vary the point at which sludge is withdrawn from the lower region of the tank into the draft tube. In this way the mouth of the draft tube may be caused to assume a position above the level of the digested sludge which has settled in the bottom of the tank and this digested sludge may be withdrawn through the outlet pipe 55 which communicates with the central portion of the bottom wall 10ᵇ without interference by the circulating apparatus.

When the pump is operated, the sludge is drawn inwardly through the bottom of the draft tube and thence moves upwardly in contact with the walls which are heated by the water circulating through the chamber 24. The heated sludge is then discharged from the pump chamber and thrown outwardly by the vanes 38ᵃ so that it moves outwardly and thence downwardly around the draft tube in paths which are indicated generally by the arrows 56 in Fig. 1. In this way there is a continual mixture of heated sludge with the scum at the top of the tank with a gradual settling of material through the contents of the tank around the draft tube. The character of the sludge to be pumped may be regulated as desired by varying the elevation of the adjustable draft 30 and the level at which the heated sludge is discharged may be controlled by varying the elevation of the pump casing 35.

Instead of circulating the sludge upwardly through the draft tube, as in the embodiment described above, the circulation may take place downwardly through the draft tube and thence upwardly around it. In Figs. 10 and 11 of the drawings there is illustrated a modification which is particularly adapted for this reversed direction of the circulation. As there shown, the draft tube 60 is surrounded by a water jacket 61 forming a chamber 62 through which the hot water is circulated for the purpose of heating the sludge which passes downwardly through the tube. Within the upper end of the draft tube 60 there is located a pump casing 63 which has an outwardly flared upper end portion 63ᵃ which serves as the intake opening. The pump has a shaft 64 which is journaled at its lower end in the lower perforated wall 63ᵇ of the pump casing and which is journaled at its upper end in the top cover 65 of the central sleeve of the tank cover. This shaft carries the impeller 66 at its lower end and is adapted to be driven by a worm wheel 67 fixed thereon and meshing with a worm 68 which is secured on the shaft 69 of an electric motor. The upper portion of the shaft 64 is surrounded by a rotary hollow shaft 70 on which is mounted the intake accelerator 71 comprising a number of vanes 71ᵃ which extend over and slightly beyond the edges of the flared portions 63ᵃ of the pump casing and which are curved longitudinally as shown in Fig. 11. These vanes are adapted to engage the scum on the surface of the sludge to draw the scum into the pump casing as the accelerator rotates. Ordinarily, it is desirable that the accelerator be driven at a slower speed than the impeller 66 of the pump and the accelerator is therefore arranged to be driven separately through a worm wheel 72 fixed on the upper end of the hollow shaft 70 and meshing with a worm 73 which is secured on the shaft 74 of another electric motor. The pump casing 63 is carried by a plate 75 which is adjustable vertically by means of adjusting members 76, as in the form of the invention first described, so that the elevation of the accelerator 71 and the mouth of the pump casing may be varied as desired with respect to the surfaces of the scum and other contents of the tank.

The apparatus of the present invention has the advantage that it hastens the digestion of the settled sewage solids due to the fact that the sludge in the bottom of the tank is stirred up slowly and this action allows the more inert non-gas producing sludge to settle to the extreme bottom where it is not disturbed by the circulation, thereby permitting only digested sludge to be removed from the tank when sludge is withdrawn through the pipe 55. The digestion of the settled sewage solids is also facilitated by the fact that an active sludge is mixed with this more inactive sludge by the circulating process and by the fact that the gases and products of decomposition are released from the sludge by the gentle stirring action. The digestion is also hastened by the fact that any local acidity in the sludge is neutralized by the mixing with the sewage at this point of a more neutral sewage brought about by the circulation.

The invention has the further advantage that it aids in the digestion of the floating grease-containing solids forming the scum layer at the top because of the fact that an active digesting sludge is mixed with the slowly digesting scum, because the scum is broken up and its gas released, allowing it to sink more readily, and because some heavier sludge particles are added to the scum layer to aid in its deposition. The deposit of the scum particles is further aided by the circulation which produces a current in a downward direction from the region of the scum layer and also by the fact that the scum layer is moistened and that its acidity is adjusted by the circulation in order to maintain a more nearly neutral or alkaline condition. The digestion of the grease contents of the scum layer is also aided by the free release of gases from the tank through the gas vent pipe 56 which leads through the top cover plate 26 because of the opening through the scum layer which is maintained by the action of the circulation.

The invention hastens the digestion of both the settled and floating scum solids due to the more effective heating of the solids and the liquor in the tank. The novel heating apparatus and circulating device produce a more uniform heating than has heretofore been possible and the heating may be controlled effectively by regulating the speed of circulation of the sludge. By this invention a relatively high temperature, for example, 125° F. to 150° F. may be obtained without danger of local sterilization of the sludge. This digestion action is aided also by the fact that the warm sludge is passed directly into the scum layer so that it is broken up and the gas released and the heat also causes a great liberation of gas from the sludge at the bottom, which release is most desirable.

The invention also has certain advantages from the mechanical operating standpoint in that the temperature of the circulating sludge need not be watched closely because of the fairly rapid rate at which the sludge passes through the draft tube. The size of the heating unit is relatively small as compared with the size of heating unit usually employed and the apparatus has the further advantage that the entire assembly may be removed for purposes of cleaning or repair at any time without the necessity of draining the tank. Only a small amount of power is required for operating the circulating apparatus and, due to the relatively rapid digestion of the settled sludge at the bottom of the tank, where it may be withdrawn without danger of withdrawing undigested sludge, it is possible to employ a tank having a flatter bottom than those heretofore used.

Although one form of the invention has been shown and described by way of illustration, it will be understood that it may be constructed in various other embodiments within the scope of the appended claims.

I claim:

1. A sludge digestion tank comprising a vessel adapted to contain the materials to be digested, a floating cover for said vessel, a draft tube carried by said cover and extending downwardly therefrom into said vessel, means for circulating said materials through said tube and thence outwardly and vertically beneath said cover, and an adjustable extension for the lower end of said tube.

2. A sludge digestion tank comprising a vessel adapted to contain the materials to be digested, a draft tube mounted in said vessel, means for positively circulating said materials through said tube, and means for heating said materials as they pass through said tube.

3. A sludge digestion tank comprising a vessel adapted to contain the materials to be digested, a draft tube mounted in said vessel, means for positively circulating said materials through said tube, a water jacket surrounding said tube, and means for circulating heated water through said water jacket during the circulation of said materials.

4. A sludge digestion tank comprising a vessel adapted to contain the materials to be digested, a draft tube mounted vertically in said vessel, an adjustable extension for the lower end of said tube, means for adjusting the position of said extension, and means for circulating said materials through said tube and thence outwardly and vertically around said tube.

5. A sludge digestion tank comprising a vessel adapted to contain the materials to be digested, a draft tube mounted vertically in said vessel, a pump mounted in said tube for effecting the circulation of said materials through said tube, and means for adjusting the position of said pump within said tube.

6. A sludge digestion tank comprising a vessel adapted to contain the materials to be digested, a draft tube mounted vertically in said vessel, a pump mounted in said tube for effecting the circulation of said materials through said tube, means for adjusting the position of said pump within said tube, an adjustable extension for the lower end of said draft tube, and means for varying the elevation of said extension.

7. A sludge digestion tank comprising a vessel adapted to contain the materials to be digested, a draft tube mounted vertically in said vessel, a pump mounted in the upper part of said tube for effecting the circulation of said materials upwardly through said tube, an adjustable extension for the lower end of said tube, and means controlled from the outside of said vessel for adjusting the elevation of said pump and said draft tube extension.

8. A sludge digestion tank comprising a vessel adapted to contain the materials to be digested, a draft tube mounted vertically in said vessel, a pump casing having a telescoping engagement with the upper part of said draft tube and having an upwardly and outwardly flaring mouth, impelling means mounted in said casing for circulating said materials upwardly through said tube and thence upwardly and outwardly from said flaring mouth, and means for adjusting said casing and said impelling means vertically in said tube.

9. A sludge digestion tank comprising a vessel adapted to contain the materials to be digested, a cover for said vessel, a draft tube secured to said cover and extending downwardly therefrom into said vessel, a pump casing mounted in the upper part of said tube, adjusting members extending downwardly through said cover and connected to said pump casing, and operating means on the outside of said cover for actuating said adjusting member.

10. A sludge digestion tank comprising a vessel adapted to contain the materials to be digested, a cover for said vessel, a draft tube secured to said cover and extending downwardly therefrom into said vessel, a pump casing mounted in the upper part of said tube, adjusting members extending downwardly through said cover and connected to said pump casing, operating means on the outside of said cover for actuating said adjusting member, an adjustable extension for the lower end of said tube, supporting means for said extension extending upwardly through said adjusting members, and means operated from a position above said cover for adjusting the elevation of said supporting means.

11. A sludge digestion tank comprising a vessel adapted to contain the materials to be digested, a cover for said vessel provided with a central opening, a lid for closing said opening, a bracket secured to said cover beneath said opening, a draft tube carried by said bracket and extending downwardly therefrom, and means for circulating said materials upwardly through said tube and thence outwardly through said bracket.

12. A sludge digestion tank comprising a vessel adapted to contain the materials to be digested, a cover for said vessel provided with a central opening, a lid for closing said opening, a bracket secured to said cover beneath said opening, a draft tube carried by said bracket and extending downwardly therefrom, means for circulating said materials upwardly through said tube and thence outwardly through said bracket, and means carried by said lid for operating said circulating means.

In testimony whereof, I have subscribed my name.

HARRY E. SCHLENZ.